Patented Feb. 26, 1935

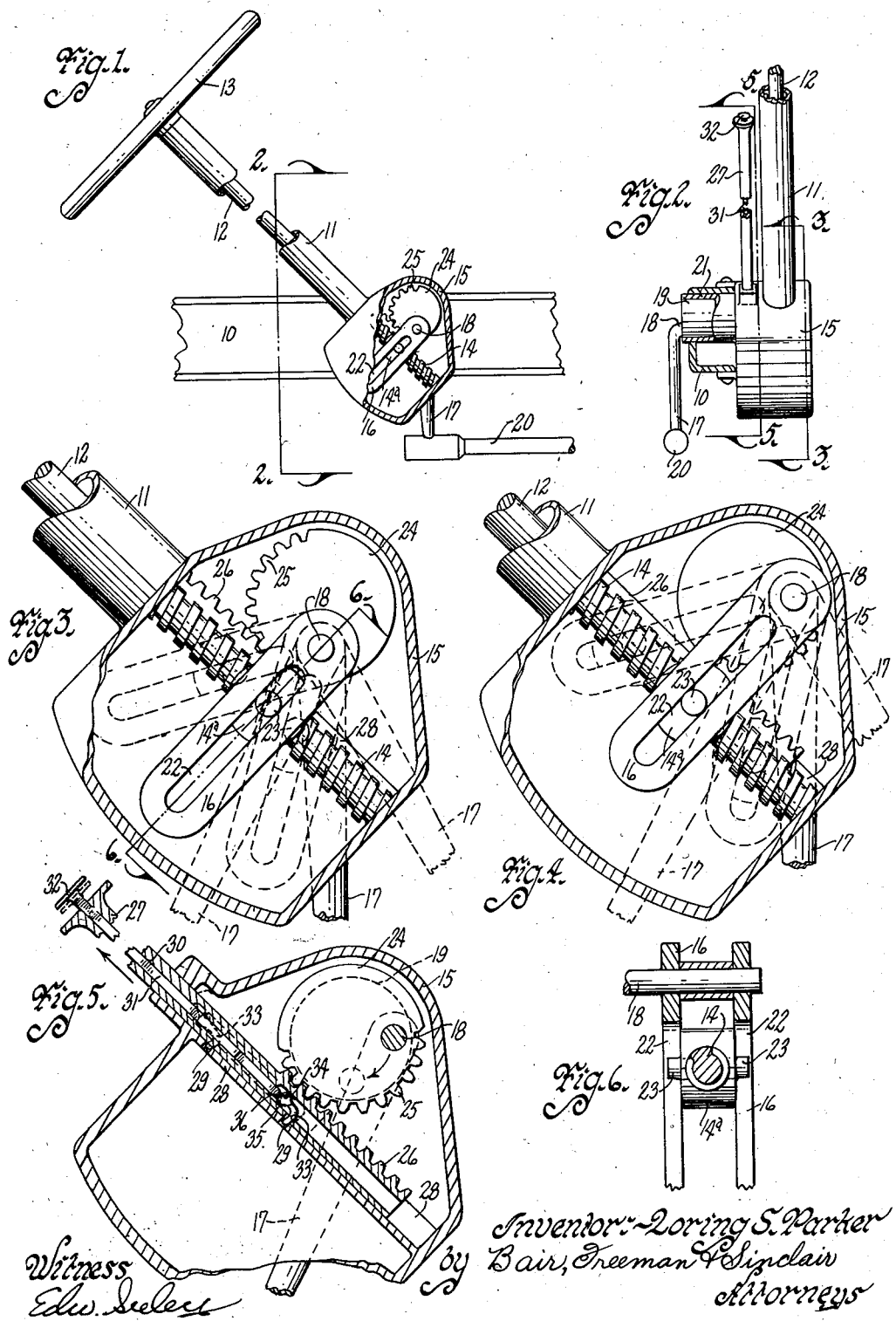

1,992,440

UNITED STATES PATENT OFFICE 1,992,440

VARIABLE COMPENSATING STEERING GEAR

Loring S. Parker, Des Moines, Iowa, assignor of one-half to Glen W. Kauffman, Des Moines, Iowa Application February 5, 1934, Serial No. 709,770

6 Claims. (Cl. 74—498)

The purpose of my invention is to provide a variable compensating steering gear.

The mechanism to be described may be used in a variety of environments, but for purposes of illustration, I have shown my device as applied to the steering mechanism of a motor vehicle.

It is my purpose to provide a variable compensating steering gear of the kind under consideration having the parts so constructed and arranged that the rotary movement of a steering shaft, for example, may be transmitted to an operated lever in such manner that the first part of the movement from an intermediate position will be maximum in distance, and as the movement continues in either direction from the intermediate position, the action becomes slower but the leverage exerted and the power transmitted to the operated lever increase.

Another object of my invention is to provide mechanism capable of adjustment, whereby the pivotal axis of the operated lever may be moved toward or from the rotating shaft.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a side elevation of a device embodying my invention installed in connection with the steering mechanism of a motor vehicle, parts being removed and parts being shown in section.

Figure 2 is a detailed sectional view taken on the line 2—2 of Figure 1.

Figure 3 is a detailed sectional view taken on the line 3—3 of Figure 2.

Figure 4 is a similar view showing the pivotal axis of the operated lever adjusted to a different position from that illustrated in Figure 3.

Figure 5 is a detailed sectional view taken on the line 5—5 of Figure 2, illustrating the details of the mechanism for adjusting the axis of the operated lever; and Figure 6 is a sectional view taken on the line 6—6 of Figure 3.

In the accompanying drawing, I have used the reference numeral 10 to indicate generally the frame of the motor vehicle having the steering post 11 and the steering shaft 12 operated from the steering wheel 13 and having the lower threaded portion 14. Suitably supported on the frame is a gear casing 15.

The operative parts of my mechanism include the threaded shaft portion 14, a nut 14ª thereon, an operating lever 16, an operated lever 17, a short shaft 18 fixed to the operating lever and to the operated lever and journalled off center in a rotatably adjustable shaft 19, together with means for rotatably adjusting the shaft 19 at will.

The operated lever 17 has suitable universal joint connection, not described in detail, with an ordinary drag link 20 forming part of the usual steering mechanism of a motor vehicle.

As here shown, the threaded portion 14 of the steering shaft 12 projects into the gear casing 15. It will be understood that suitable bearings of any desired kind may be provided for the shaft 12 and its threaded portion 14. Journalled in the wall of the casing 15 and in the sleeve 21 projecting therefrom is the adjustable shaft 19. Rotatably mounted off center in the shaft 19 and parallel with the axis thereof is the shaft 18. Fixed to one end of the shaft 18 is the operated lever 17. One end of the lever 16 is fixed to the shaft 18. The main body of the lever 16 is provided with a longitudinal elongated slot 22.

The nut 14ª, which is mounted on the threaded portion 14 to coact therewith and best to travel lengthwise on the threaded portion when the threaded portion is rotated, has oppositely extending trunnions 23 which are received in the slots 22 of the lever 16. As seen in Figure 6, the lever 16 is bifurcated so as to receive between its two arms the nut 14ª.

I shall now explain the operation of the device as described up to this point and will thereafter further describe the mechanism for adjusting the shaft 18 and effect of the use of such mechanism on the operation of the entire device.

The operation of this device may be made clearer if it is described in connection with its use in a motor vehicle. Let us assume that at the start of the operation, the long axis of the lever 16 is at right angles to the axis of the shaft 12. Assume then that the shaft 12 is rotated to the right or clockwise from its position shown in Figure 2. Then the nut 14ª will tend to travel upwardly on the threaded portion 14 from its position shown in Figure 3. This will actuate the lever 16 for moving it from its full line position in Figure 3 toward its upper dotted line position illustrated in that figure.

If, on the other hand, the shaft 12 were rotated in the opposite direction, then the nut 14ª would move from its assumed starting position downwardly on the threaded portion 14 and the lever 16 would move from its full line position illustrated in Figure 3 toward its lower dotted line position illustrated in that figure.

The first assumed movement of the lever 16 would result in the movement of the lever 17 from its full line position of Figure 3 to its left hand dotted line position, whereas the second assumed movement of the lever 16 would result in moving the lever 17 from its full line position shown in Figure 3 to its right hand dotted line position shown in that figure.

During the first part of either of these assumed movements, a minimum rotation of the shaft 12 will impart maximum motion to the lever 16 and as the movement continues, the trunnions 23 will travel away from the shaft 18 and as this travel continues, it will be clear that a given rotation of the shaft 12 imparts less motion to the lever 16 and consequently to the lever 17.

As the movement continues, the trunnions move away from the shaft 18 and for each revolution of the shaft 12, the arc of travel of the lever 16 becomes proportionally less.

Also the trunnions 23 travel on an inclined plane of ever increasing inclination as the lever moves away from its central position.

There is an advantage in driving a motor vehicle, especially at high speeds in being able to transmit motion of the steering wheel with maximum speed to the steering mechanism.

There is likewise an advantage, especially in parking, in being able to operate the steerable wheels of the car, with a minimum of effort.

Both of these advantages inhere in my device. My device as thus described therefore has a marked advantage over the current types of steering gears.

It is a matter of common knowledge that with the steering mechanisms now commonly in use on automobiles it requires more power to complete the movement of the front wheels from their normal position toward their position at the final limit of their turning than it does to give them their initial movement from normal position.

It will therefore be seen that my device affords a compensating action because of the increase in the distance between the trunnions and the shaft 18 and in taking advantage of the principle of the inclined plane, as has already been explained.

*Adjustment of the shaft 18 to different locations*

Due to the fact that the power requirements in parking a motor vehicle are so much greater than when said vehicle is travelling at moderate or high speed, I am incorporating a further mechanical advantage by providing means of adjusting the distance between the trunnions 23 and the shaft 18.

By moving the shaft 18 farther from the trunnions 23 and the shaft 12, I afford greater leverage and take advantage of the inclined plane principle, as before mentioned, for parking purposes. This is accomplished without sacrificing any benefit of the compensating feature already described.

It will be observed that the shaft 19 has on its inner end a flange 24 which is toothed, as indicated at 25. A slidable rack bar 26 has its teeth in mesh with those of the flange 24.

I provide the projecting handle 27 for the rack bar. By moving the rack bar lengthwise, the flange 24 and the shaft 19 may be rotated for moving the shaft 18 from the dotted line position shown in Figure 5 to the full line position thereof and back.

The mechanism is shown in driving position in Figure 3 and in parking position in Figure 4. It will be understood that the handle 27 projects upwardly through the dash so that it is accessible to the driver of the car.

The rack bar 26 is guided by the channel 28 in which it travels. In the bottom of the channel 28 are recesses 29 to receive the locking latch now to be described.

I provide means for locking the rack bar in any desired adjusted position. The rack bar has a bore 30 extending through it. An operating rod 31 is slidably mounted in this bore and projects upwardly beyond the rack bar and is provided with a head 32. A curved latch 33 is pivoted as at 34 to the rack bar 26 and has a rounded lug 35 received in a socket 36 in the rod 31. Thus when the rod 31 is in the position shown in full lines in Figure 5 and the latch registers with one of the holes 29, the free end of the latch will enter the hole and the rack bar will thus be locked in its then position.

If, however, the rod 31 is moved downwardly from its position shown in Figure 5, the latch 33 will be retracted to clear the hole 29, whereupon the rack bar may be slid lengthwise.

While I have shown only two openings 29, it is obvious that as many of such recesses may be provided as may be desired and that the rack bar may be so adjusted that the mechanism may be used with the shaft 18 in any of its possibly adjusted positions intermediate of the extreme positions illustrated by dotted and full lines in Figure 5.

While I have shown a rack and pinion type of device for providing for the adjustment of the shaft 18, it is obvious that other known means for making such adjustment might be used according to the taste or desire of the particular designer.

It will, of course, be understood that greater effort is required to turn the front wheels of an ordinary automobile during the parking operation than is necessary for turning them in driving on the highway. It is hard to turn these wheels when the car is not moving or when it is moving very slowly. By the adjustment which I have described above, it is obvious that I have made it possible to move the shaft 18 from its position of Figure 3 to its position of Figure 4, and thereby increase the effective length of the lever 16, and so have reduced the effort necessary to operate the steering wheel and the shaft 12.

This is particularly important in parking with large and heavy cars.

It will be observed that the user of the car can make the adjustment very easily. If after the car has been parked, it is driven away, the driver can very readily make the adjustment of the parts to the position shown in Figure 3.

I have thus provided a compensating feature which has been above described and have also devised the structure whereby the benefit of the compensating feature is retained even when the shaft 18 is moved away from the shaft 12 and the parts adjusted to the most convenient position for parking.

While I have described my mechanism as peculiarly adapted for use on a motor vehicle steering assembly, it is my purpose to cover by the patent to be issued thereon, any use to which the structure disclosed herein may be properly put and it is my purpose to cover by my claims, any modifications in structure or arrangement of parts, or use of materials which may reasonably come within the scope of my invention and of my claims.

I claim as my invention:—

1. In a device of the class described, a threaded shaft, a nut thereon, a second rotatably mounted shaft, an operated lever fixed on the second shaft, an operating lever fixed on the second shaft and having a sliding pivotal connection with said nut and means for mounting the second shaft for adjustment toward and from the first shaft for the purpose of changing the throw of said operating lever.

2. In a device of the class described, a threaded shaft, a nut thereon, a second rotatably mounted shaft, an operated lever fixed on the second shaft, an operating lever fixed on the second shaft and having a sliding pivotal connection with said nut and means for mounting the second shaft for adjustment toward and from the first shaft for the purpose of changing the throw of said operating lever, said means comprising a rotatable member in which the second shaft is mounted off-center.

3. In a device of the class described, a threaded shaft, a nut thereon, a second rotatably mounted shaft, an operated lever fixed on the second shaft, an operating lever fixed on the second shaft and having a sliding pivotal connection with said nut and means for mounting the second shaft for adjustment toward and from the first shaft for the purpose of changing the throw of said operating lever, said means comprising a rotatable member in which the second shaft is mounted off-center and means for rotating the rotatable member for moving the second shaft on the arc of a circle.

4. In a device of the class described, a shaft, a second shaft, an operated lever fixed to the second shaft, a member fixed to the second shaft and associated with the first shaft for operation thereby whereby rotation of the first shaft imparts maximum travel to the member at the beginning of its movement from an intermediate position and imparts proportionally decreasing travel to the member during the movement from such position and means for adjusting the second shaft toward and from the first shaft for the purpose of changing the throw of the member without disconnecting it from the first shaft.

5. In a device of the class described, a threaded shaft, a nut thereon, a second shaft rotatably mounted, an operating lever fixed thereto, said operating lever having a sliding pivotal connection with said nut, rotatable means for mounting the second shaft for adjustment toward and away from the first shaft for the purpose of changing the throw of said operating lever, a pinion on said rotatable means and a rack for rotating said pinion.

6. In a device of the class described, a threaded shaft, a nut thereon, a second shaft rotatably mounted, an operating lever fixed thereto, said operating lever having a sliding pivotal connection with said nut, rotatable means for mounting the second shaft for adjustment toward and away from the first shaft for the purpose of changing the throw of said operating lever, a pinion on said rotatable means, a rack for rotating said pinion and means for locking said rack at different positions of its travel.

LORING S. PARKER.